United States Patent [19]

Merkle

[11] 3,998,923
[45] Dec. 21, 1976

[54] METHOD FOR MAKING OBJECTS FROM PLASTICS BY MEANS OF COMPRESSION MOULDING

[76] Inventor: Hans-Jurgen Merkle, Conrad-Celtis-Str. 19, 8 Munich 70, Germany

[22] Filed: May 28, 1974

[21] Appl. No.: 473,834

[30] Foreign Application Priority Data

May 30, 1973 Germany .......................... 2327627

[52] U.S. Cl. ................................. 264/314; 264/327
[51] Int. Cl.² ........................ B29F 5/00; B29G 1/00
[58] Field of Search ..................... 264/314, 327, 313

[56] References Cited
UNITED STATES PATENTS

| 2,314,378 | 3/1943 | Van Rossem | 264/327 |
| 2,456,513 | 12/1948 | Johnson | 264/314 |
| 2,541,297 | 2/1951 | Sampson et al. | 264/327 |
| 2,838,435 | 6/1958 | Hewett | 264/314 |
| 2,898,633 | 8/1959 | Burch | 264/99 |
| 2,977,268 | 3/1961 | Randolph | 264/314 |
| 3,050,780 | 8/1962 | Pollitt | 264/314 |
| 3,135,640 | 6/1964 | Kepka et al. | 264/314 |
| 3,530,208 | 9/1970 | Rausing | 264/314 |
| 3,790,650 | 2/1974 | Heier | 264/327 |

Primary Examiner—Jan H. Silbaugh
Attorney, Agent, or Firm—Diller, Brown, Ramik & Wight

[57] ABSTRACT

A method and a device for making objects from plastics, wherein a plastic present in the moulding cavity is made to set while pressure is maintained, said moulding pressure being made to act on the plastic being moulded by means of the inflation of one or more fully or partly flexible and expansible moulding tools.

3 Claims, 3 Drawing Figures

METHOD FOR MAKING OBJECTS FROM PLASTICS BY MEANS OF COMPRESSION MOULDING

The invention relates to a method of making objects from plastics by means of compression moulding, a plastic present in the cavity of a mould being made to set while a moulding pressure is maintained, and also to a device for performing this method.

Plastics can be moulded in any given manner while in the plastic condition. For example, the plastic can be introduced into a hollow mould for this purpose. While the plastic material, particularly thermoplastic material is setting, sunk spots may form on the surfaces and pockets may arise inside the plastic as a result of shrinkage, especially when the object being moulded has relatively thick walls. In order to avoid these disadvantages, a moulding force which acts on the setting plastic is applied during the whole setting time in the known manner.

The danger of pocket formation and of the formation of sunk spots on the surface of the moulded bodies exists not only in the case of objects having plane surfaces, such as boards, but also with bodies having complicated geometric shapes. The compression moulding method, if possible at all, was very awkward and difficult to carry out particularly for geometrically complicated bodies which for example have spherical curvatures and differing wall thicknesses or exhibit parts with undercuts. Compression moulding has so far been employed only with respect to relatively large, simply shaped objects whereas smaller, more complicated shapes have been manufactured by means of injection moulding.

In the making of containers from polyester resin it is known to spray the liquid polyester resin onto an inflatable, soft plastic sheet which corresponds to the inner contours of the container being made. When the layer of polyester applied to the inflated plastic sheet is cured, the plastic sheet can be taken out of the interior of the cured polyester body after the compressed air has been let out (German document laid open for inspection No. 1,704,239). This known form does not serve to mould a plastic container by means of compression because, since there is no counter-mould, no pressure can be exerted on the plastic when the latter is being cured.

It is also known to make use of elastic core sleeves to make mouldings with undercuts. After the curing of the moulded plastic object, the elastic core is drawn out of the cured object, the elastic core being able to yield at the places where there are elevations and undercuts (German document laid open for inspection No. 1,778,070). When the plastic is curing or setting, pressure is not exerted on it in this known device either.

The object of the invention therefore consists in rendering possible the manufacture also of plastic bodies of complicated shape as well as large-size objects with plane surfaces by means of compression moulding, undesired sunk spots in the surfaces of the bodies and occlusions in the plastic material being prevented. In the method represented at the beginning this object is achieved in accordance with the invention in that the moulding pressure is made to act on the plastic being moulded by means of the inflation of one or more fully or partly flexible and expansible moulding tools. In a preferred embodiment the inflatable moulding tool is designed in the form of a moulding core.

In order to achieve regular setting of the plastic in every area of a large-size body, particularly large-size bodies having plane dimensions, cooling and heating are simultaneously applied from outside and inside after the moulding of the plastic, the heating being applied in those areas where the plastic sets most quickly of all. When use is made of a partly rigid and partly flexible and expansible moulding tool, for example a moulding core, the heating is initially applied in the area of the flexible and expansible parts of the moulding tool while the plastic is setting.

According to the invention the inner contours of the hollow body can be produced by means of a flexible and expansible moulding core for the purpose of making that hollow body. The shape of the moulding core is kept stable by means of compressed air. The shaping process and the application of the moulding pressure to the plastic can be done pneumatically, air being pumped into the flexible and expansible moulding tool so that the plastic being moulded is so displaced that it adapts itself to the shape of the pumped-up moulding tool. Of course, the moulding tool may also be expanded hydraulically.

The moulding pressure is also maintained after the moulding process and during the entire course of the setting of the plastics. If the plastic is set by means of cooling, a cooling action is initially applied to the plastic compound, starting at the outer zones so that inside where the moulding pressure acts directly on the plastic via the inflated moulding tool, the plastic retains its plastic consistency longest. This is an effective way of preventing pockets from forming.

When use is made of a partly rigid and partly flexible and expansible moulding core or moulding tool, the heating is applied in the area of the flexible and expansible parts of the moulding tool while the plastic is setting. This prevents the formation, in the plastic material, of a through solidified zone which still includes some plastic mass in its interior which would lead to the formation of pockets. If certain areas of the moulding tool are heated now, no through solidified plastic zones will be able to form. In order to avoid inclusions of plastic plastics being left in through solidified manner, cooling is initially applied from outside and inside after the shaping of the plastic, and the heating circuits situated in the area of the flexible and expansible zones of the moulding tool or moulding core are heated simultaneously. In the final setting phase the heating zones are then switched over to cooling so that a cooling action is also applied to the area of the flexible and expansible zones of the moulding tool or moulding core.

The advantages of the invention are constituted by the fact that objects of large shape and plane surfaces as well as objects of complicated geometric shape can be manufactured. The objects can have differing wall thicknesses, differing spherical curvatures and also undercuts.

Devices according to the invention, with which the method according to the invention can be performed, are represented in the attached drawings which simultaneously serve to explain the invention.

Figure 1:
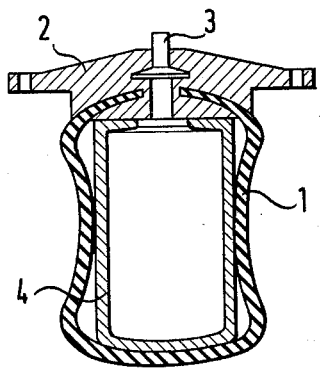
FIG. 1 shows a flexible and expansible moulding core of a compression moulding device.

FIG. 1 represents a flexible and expansible moulding core 1 which is installed in a base plate 2 in tight fashion. In base plate 2 there is an inlet valve 3 through which the compressed air is introduced into the interior of the expansible moulding core 1. There is also a reinforcing frame 4 in the interior of moulding core 1.

Figure 2:
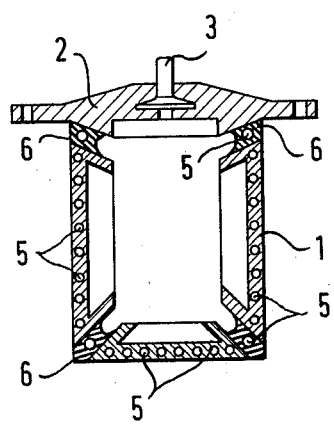
FIG. 2 shows a partly flexible and expansible moulding core of a compression moulding device.

FIG. 2 represents a partly flexible and expansible moulding core 1 which has heating and cooling ducts 5. Further, there are also seals 6 which similarly incorporate heating and cooling ducts. Compressed air can be introduced into the interior of moulding core 1 through inlet valve 3.

Figure 3:
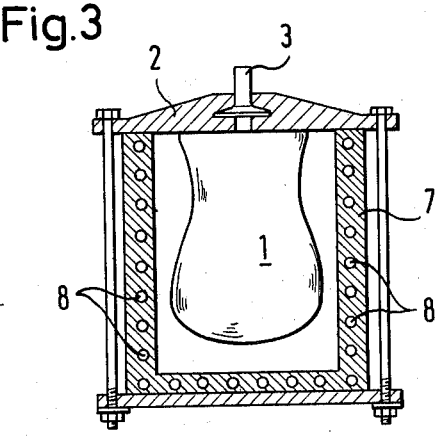
FIG. 3 shows a compression moulding device having a built-in, flexible and expansible moulding core.

FIG. 3 represents a compression moulding tool in which the flexible and expansible moulding core 1 which is installed in base plate 2 in tight fashion is situated in the interior of an outer mould 7. Said outer mould also has heating and cooling ducts 8. Compressed air can be introduced into the interior of the expansible moulding core 1 through inlet valve 3. The plastic which is to be moulded is situated between the inflatable moulding core 1 and outer mould 7. After the plastic has set, the compressed air is let out through valve 3. The moulding core can then be taken out of the cavity of the moulded hollow body without further difficulty.

I claim:

1. A method of making objects having no undesired pockets or sunk spots therein from plastics material, said method comprising the steps of:
   a. providing a molding tool having a cavity therein and having flexible and expansible zones forming a portion of an interior cavity defining surface;
   b. disposing said plastics material in said cavity of said molding tool and applying and maintaining molding pressure on said plastics material by expansion of said zones;
   c. cooling said plastics material in said cavity across the entire exterior surface thereof and across that portion of the interior surface thereof which is not in the region of said flexible and expansible zones to solidify said plastics material;
   d. heating, simultaneously with step (c), said plastics material only in the region of said flexible and expansible zones to prevent formation of a through solidified zone in said plastics material; and
   e. cooling said plastics material in the region of said flexible and expansible zones in the last phase of solidification of said plastics material.

2. A method as recited in claim 1 wherein, during step (a), there is provided a molding tool which is partly rigid and partly flexible and expansible.

3. A method as recited in claim 1 wherein, during step (b), the molding pressure is maintained by fluid means selected from pneumatic and hydraulic.

* * * * *